(12) United States Patent
Yang

(10) Patent No.: US 11,107,378 B2
(45) Date of Patent: Aug. 31, 2021

(54) MISCHARGE DETECTION METHOD, MISCHARGE DETECTION APPARATUS, AND DISPLAY APPARATUS

(71) Applicant: HKC CORPORATION LIMITED, Shenzhen (CN)

(72) Inventor: Yanna Yang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/043,700

(22) PCT Filed: Dec. 24, 2018

(86) PCT No.: PCT/CN2018/123177
§ 371 (c)(1),
(2) Date: Sep. 30, 2020

(87) PCT Pub. No.: WO2020/107590
PCT Pub. Date: Jun. 4, 2020

(65) Prior Publication Data
US 2021/0142703 A1    May 13, 2021

(30) Foreign Application Priority Data
Nov. 30, 2018   (CN) .......................... 201811452652.3

(51) Int. Cl.
*G09G 3/00* (2006.01)
*G09G 3/20* (2006.01)
*B23K 1/00* (2006.01)

(52) U.S. Cl.
CPC .............. *G09G 3/006* (2013.01); *G09G 3/20* (2013.01); *B23K 1/0016* (2013.01);
(Continued)

(58) Field of Classification Search
CPC ... G09G 2300/0426; G09G 2300/0452; G09G 2330/10; G09G 3/3233
See application file for complete search history.

(56) References Cited

U.S. PATENT DOCUMENTS

2006/0290277 A1* 12/2006 Takahashi ........... H01L 51/5206
313/517
2011/0141376 A1* 6/2011 Tsubata ............. G02F 1/136213
348/731
(Continued)

FOREIGN PATENT DOCUMENTS

CN   201314985 Y   9/2009
CN   101556382 A   10/2009
(Continued)

*Primary Examiner* — Gerald Johnson
(74) *Attorney, Agent, or Firm* — Bayramoglu Law Offices LLC

(57) ABSTRACT

A mischarge detection method, a mischarge detection apparatus, and a display apparatus are provided. The mischarge detection method includes: acquiring a target sub-pixel; cutting off a connection between the target sub-pixel and sub-pixels adjacent to the target sub-pixel in a vertical direction; cutting off a connection between the target sub-pixel and the target data line; outputting a scanning signal of the target scanning line to the pixel electrode of the target sub-pixel through the target data line, the target common electrode line sequentially; acquiring the scanning signal of the target scanning line from the pixel electrode of the target sub-pixel; and acquiring a mischarge degree of an array substrate according to the scanning signal of the target scanning line.

20 Claims, 5 Drawing Sheets

(52) U.S. Cl.
CPC ......... *G09G 2300/0443* (2013.01); *G09G 2310/0267* (2013.01); *G09G 2310/0275* (2013.01)

(56) References Cited

U.S. PATENT DOCUMENTS

2018/0315369 A1 11/2018 Pyun et al.
2019/0156740 A1* 5/2019 Xu ................. H01L 27/3276

FOREIGN PATENT DOCUMENTS

| CN | 102455554 A | 5/2012 |
| CN | 103676243 A | 3/2014 |
| CN | 106526923 A | 3/2017 |
| KR | 20180027270 A | 3/2018 |

* cited by examiner

MISCHARGE DETECTION METHOD, MISCHARGE DETECTION APPARATUS, AND DISPLAY APPARATUS

CROSS REFERENCE TO THE RELATED APPLICATIONS

This application is the national phase entry of International Application No. PCT/CN2018/123177, filed on Dec. 24, 2018, which is based upon and claims priority to Chinese Patent Application No. 201811452652.3, filed on Nov. 30, 2018, the entire contents of which are incorporated herein by reference.

TECHNICAL FIELD

The present application relates to the field of display technology, and more particularly to a mischarge detection method, a mischarge detection apparatus, and a display apparatus.

BACKGROUND

The statements here only provide background information related to this application, and do not necessarily constitute prior art. With people's growing visual requirements, display panels with large-size, high-resolution have become more and more widely utilized in industrial technology. As the larger the picture size in the display panel becomes, the longer the driving wiring in the array substrate becomes; and because the driving wiring includes electronic components such as capacitors and resistors connected in sequence, in the scan driving process of the sub-pixels, the traditional technology often requires simultaneous transmission of driving signals from both ends of the driving wiring to realize the process of directional scan of the display panel. Since the driving signals vary in the transmission time and consumption when being transmitted in the driving wiring, in the process of directional scan of the display panel, the driving signals transmitted from two ends of the driving wiring may have a certain transmission delay, that is, the mischarge phenomenon of the display panel. The mischarge phenomenon caused by the transmission delay of the driving signal in the driving wiring will greatly reduce the quality of picture display in the display panel, and brings adversely influence on the user's visual experience.

Therefore, in order to improve the quality of the picture display in the display panel, technicians need to detect the mischarge degree of the array substrate in time to prevent the picture quality in the display panel from being greatly reduced. However, the conventional detection apparatus often has relatively large volume, while the driving wiring in the substrate has extremely small width, which makes the technicians unable to acquire the driving signal in the driving wiring by using the detection apparatus. Thus, the conventional technology cannot accurately detect the mischarge degree of the array substrate, and the mischarge phenomenon of the array substrate may result poor picture quality of the display panel and poor user visual experience.

SUMMARY

It is an objective of the present application to provide a mischarge detection method, a mischarge detection apparatus, and a display apparatus, which aims at solving the technical problems including but not limited to that the exemplary technology is unable to accurately detect the mischarge degree of the array substrate, that the mischarge phenomenon of the array substrate results poor picture quality of the display panel and poor user visual experience and also lowers the practical value of the display panel.

Technical solutions adopted by embodiments of the present application are as follows: a mischarge detection method, comprises:

acquiring a target sub-pixel that is to be detected, and acquiring a target scanning line and a target data line that are connected to the target sub-pixel, and a target common electrode line adjacent to the target sub-pixel;

cutting off a connection between the target sub-pixel and sub-pixels adjacent to the target sub-pixel in a vertical direction;

cutting off a connection between the target sub-pixel and the target data line;

sequentially connecting the target scanning line, the target data line, the target common electrode line, and the pixel electrode of the target sub-pixel;

acquiring a scanning signal of the target scanning line from the pixel electrode of the target sub-pixel;

acquiring a mischarge degree of an array substrate according to the scanning signal of the target scanning line; and displaying the mischarge degree of the array substrate.

It is another objective of the present application to provide a mischarge detection apparatus. The mischarge detection apparatus comprises:

a target sub-pixel acquisition circuit, configured for acquiring a target sub-pixel that is to be detected, and acquiring a target scanning line and a target data line that are connected to the target sub-pixel, and a target common electrode line adjacent to the target sub-pixel;

a first cutoff circuit, configured for cutting off a connection between the target sub-pixel and sub-pixels adjacent to the target sub-pixel in a vertical direction;

a second cutoff circuit, configured for cutting off a connection between the target sub-pixel and the target data line;

a welding circuit, configured for sequentially connecting the target scanning line, the target data line, the target common electrode line, and the pixel electrode of the target sub-pixel;

a signal acquisition circuit, configured for acquiring a scanning signal of the target scanning line from the pixel electrode of the target sub-pixel;

a status acquisition circuit, configured for acquiring a mischarge degree of an array substrate according to the scanning signal of the target scanning line; and a status display circuit, configured for displaying the mischarge degree of the array substrate.

It is still another objective of the present application to provide a display apparatus, comprising: a memory, a processor, and a computer program stored in the memory and configured for running on the processor. The display apparatus further comprises a display panel, and the display panel comprises a plurality of sub-pixels arranged in an array, and each sub-pixel is defined by intersections of scanning lines and data lines. The processor is configured for implementing a mischarge detection method when executing the computer program.

The mischarge detection method comprises:

acquiring a target sub-pixel that is to be detected, and acquiring a target scanning line and a target data line that are connected to the target sub-pixel, and a target common electrode line adjacent to the target sub-pixel;

cutting off a connection between the target sub-pixel and sub-pixels adjacent to the target sub-pixel in a vertical direction;

cutting off a connection between the target sub-pixel and the target data line;

sequentially connecting the target scanning line, the target data line, the target common electrode line, and the pixel electrode of the target sub-pixel;

acquiring a scanning signal of the target scanning line from the pixel electrode of the target sub-pixel;

acquiring a mischarge degree of an array substrate according to the scanning signal of the target scanning line; and displaying the mischarge degree of the array substrate.

In the mischarge detection method provided by the embodiments of the application, the target sub-pixel to be detected that has the maximum mischarge degree is acquired in the array substrate, and the mischarge degree of the entire display panel can be reflected by the mischarge degree of the scanning signal in the target sub-pixel. The target sub-pixel is disconnected from the adjacent sub-pixels in the vertical direction, and the target sub-pixel is disconnected from the adjacent data line to prevent adjacent sub-pixels and data signals in the data line from interfering with the detection process of the target sub-pixel. The scan signal in the scan line connected to the sub-pixel is transmitted to the pixel electrode of the sub-pixel. Due to the large area of the pixel electrode, the technician can accurately obtain the scan signal on the scan line to achieve accurate detection of the mischarge degree of the target sub-pixel. Therefore, the present application introduces the scan signal of the scan line to the pixel electrode in the sub-pixel, the scan signal can be accurately obtained from the pixel electrode, and the mischarge degree of the array substrate can be accurately detected according to the scan signal, in this way, the picture quality in the display panel is improved and a better user experience can be obtained.

DETAILED DESCRIPTION OF THE DRAWINGS

In order to more clearly illustrate the technical solutions in the embodiments of the present application, the drawings that need to be used in the description of the embodiments or the exemplary art will be briefly described hereinbelow. Obviously, the accompanying drawings in the following description are only some embodiments of the present application. For those skilled in the art, other drawings can be obtained based on these drawings without creative work.

DETAILED DESCRIPTION OF THE EMBODIMENTS

Figure 1:
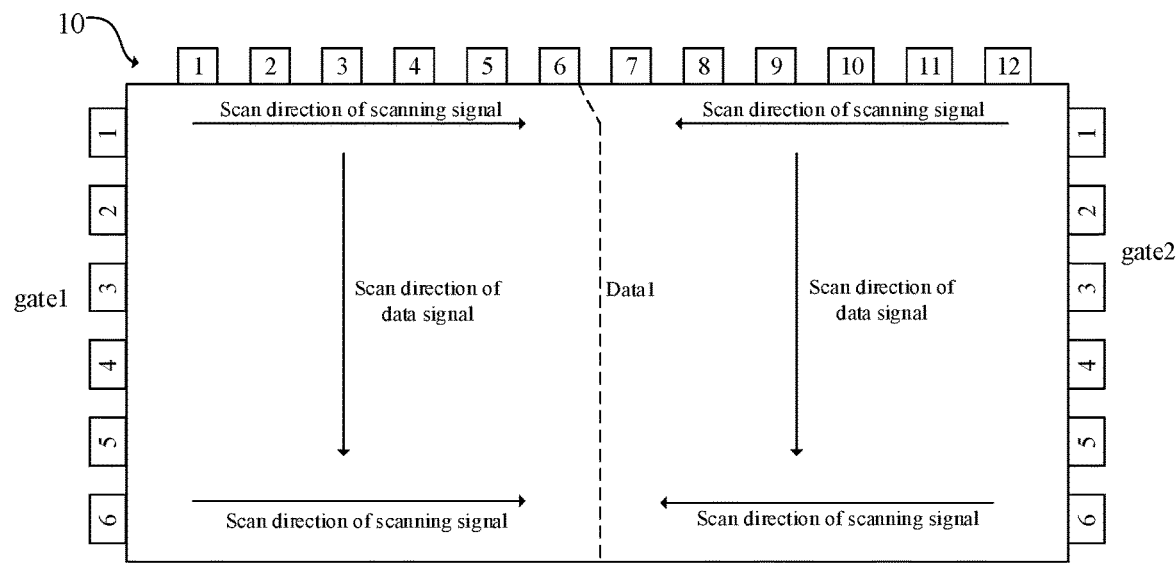
FIG. 1 is an overall structure diagram of an array substrate provided by an embodiment of the present application.

In order to make the purpose, technical solutions, and advantages of this application clearer, the present application will be further described in details in combination with the accompanying drawings and embodiments. It should be understood that the specific embodiments described here are only used to explain the present application, and are not used to limit the present application.

It should be noted that when a circuit is said to be "fixed on" or "installed on" another circuit, it can be directly or indirectly on the other circuit. When a circuit is said to be "connected" to another circuit, it can be directly or indirectly connected to the other circuit. The terms "upper", "lower", "left", "right", etc. indicate the orientation or positional relationship based on the orientation or positional relationship shown in the drawings, and are only for ease of description, and do not indicate or imply the device referred to or the element must have a specific orientation, and be constructed and operated in a specific orientation, and therefore cannot be construed as a limitation of the present application. For those skilled in the art, the specific meaning of the above terms can be understood according to specific conditions. The terms "first" and "second" are only used for ease of description, and cannot be understood as indicating or implying relative importance or implicitly indicating the number of technical features. The meaning of "plurality" means two or more than two, unless otherwise particularly defined.

In order to illustrate the technical solutions described in the present application, detailed descriptions are given below in combination with accompany drawings and embodiments.

According to the composition structure of a display panel in the art, the display panel usually includes: an array substrate, a color filter substrate, and a liquid crystal molecular layer distributed between the array substrate and the color filter substrate. The array substrate is the core component of the display panel. Working state of the array substrate plays an extremely important role in the image display quality of the display panel.

Exemplarily, FIG. 1 shows an overall structure diagram of an array substrate 10 provided by an embodiment. As shown in FIG. 1, a cyclic scanning process can be implemented on the array substrate 10 through scanning signals and data signals, so as to drive the image of the display panel to be at a normal working state. However, during the process of the cyclic scan driving of the array substrate, both the two ends gate1 and gate2 of the array substrate in the horizontal direction can be introduced with scanning signals to achieve the bidirectional driving process. The scanning signals from the two ends of the array substrate 10 have transmission differences during the transmission process, which causes the transmission delay of the scanning signals at the two ends of the array substrate 10 during the bidirectional driving process, that is, the mischarging of the scanning signals. Accordingly, the larger the spatial layout of the substrate 10 is, the greater the transmission delay of the scanning signal during the bidirectional driving process is. This mischarging phenomenon will greatly damage the quality of the picture in the display panel and cause unclear image/video display. According to the spatial layout of the array substrate 10 shown in FIG. 1, in the horizontal direction, the data line Data1 in the middle area and the two ends gate1 and gate2 of the array substrate 10 have the longest average transmission path. During the bidirectional driving process of the scanning signal in the array substrate 10, in the entire plane area of the array substrate 10, the scanning signal at two ends of the data line Data1 in the middle area of the array substrate 10 has the most serious transmission delay and most serious mischarging of the scanning signal. In the array substrate 10, the data line Data1 in the middle area has the most serious mischarge degree; the data line Data1 in the middle area is the most representative, and the overall mischarge degree of the array substrate 10 can be known through the data line Data1 in the middle area.

Figure 2:
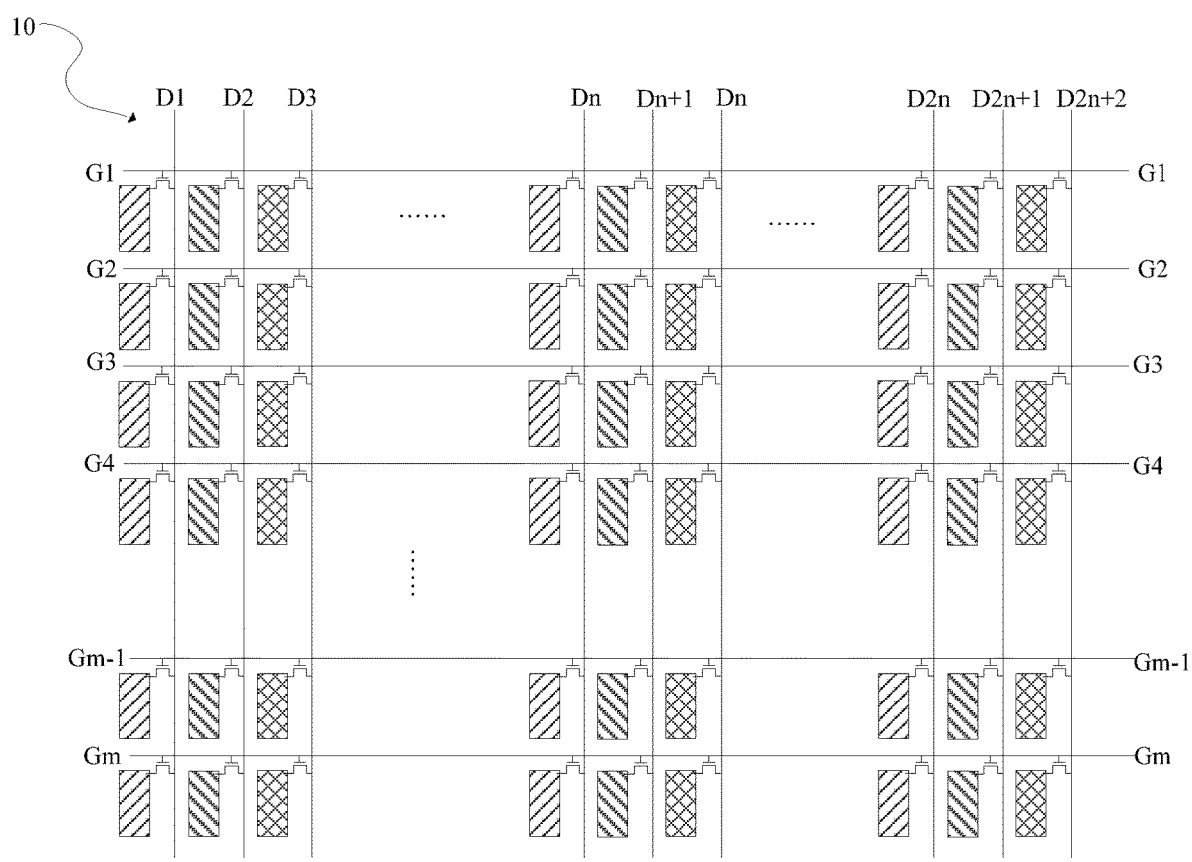
FIG. 2 is a structure diagram of an array substrate provided by an embodiment of the present application

Exemplarily, FIG. 2 shows the structure of the array substrate 10 provided by an embodiment of the present application. As shown in the figure, the array substrate 10 includes: multiple data lines D arranged in an array in a horizontal direction, multiple scanning lines G arranged in an array in a vertical direction, multiple common electrode lines COM arranged in an array in the vertical direction, and multiple sub-pixels arranged in an array. Each sub-pixel is defined by intersections of data lines D and scanning lines G, and includes a pixel electrode and a switch tube. The pixel electrode is connected to the data line D and the scanning line G through the switch tube, and the multiple common electrode lines COM and the multiple data lines D are arranged in the same layer.

In this embodiment, the data line D transmits a data signal, and image data is provided to each sub-pixel through the data signal to adjust the working state of each sub-pixel. The scanning line G transmits a scanning signal, and each sub-pixel can be controlled to be in an on or off state by the scanning signal, so that multiple sub-pixels can work together, and the display panel can display a complete picture. Therefore, in this embodiment, each sub-pixel can be driven in a stable working state through the data signal and the scanning signal, to realize the cyclic scan driving process of multiple sub-pixels and enable the display panel to display a clear and complete picture.

In the structure of the array substrate 10 shown in FIG. 2, each sub-pixel includes a pixel electrode and a switch tube. When the switch tubes are in different on and off states, the pixel electrodes are introduced with corresponding data signals, and emit light source of corresponding colors according to the data signals, in this way, the image/video display function of the multiple sub-pixels in the display panel is realized. In addition, in the vertical direction, all the sub-pixels located in the same column are connected to the same data line D, and the data signal transmitted in the same data line D can synchronously scan-drive all the sub-pixels in the same column, which improves the scan driving efficiency of the sub-pixels in the array substrate 10. Exemplarily, in FIG. 2, the first conduction terminal of the switch tube is connected to the data line D, the control terminal of the switch tube is connected to the scanning line G, and the second conduction terminal of the switch tube is connected to the pixel electrode. When the scanning line G outputs the scanning signal to the control terminal of the switch tube, the switch tube can be controlled by the level state of the scanning signal to be turned on or off. When the switch tube is turned on, the first conduction terminal and the second conduction terminal of the switch tube are directly connected, and then the pixel electrode is input with the data signal, and the working state of the pixel electrode is changed through the data signal, such that the display panel can present a complete picture. Therefore, the array substrate 10 in this embodiment realizes the scan driving process of multiple sub-pixels by a relatively simplified circuit structure, which reduces the picture driving cost of the display panel.

As an optional embodiment, in the above sub-pixels, the switch tube is a field effect tube or a triode. Exemplarily, as shown in FIG. 2, the switch tube is a MOS tube, where the gate of the MOS tube is connected to the scanning line G, the drain of the MOS tube is connected to the data line D, and the source of the MOS tube is connected to the pixel electrode. The MOS tube can be controlled to be turned on or off by the scanning signal of the scanning line G to control the working state of the sub-pixels.

In this embodiment, the common electrode line and the data line D are located on the same layer, the common electrode line stores a common voltage, and each common electrode line is adjacent to the pixel electrode in the corresponding sub-pixel. In one sub-pixel, when the MOS tube is turned on, the data voltage applied on the data line D and the common voltage applied on the common electrode line are output to the corresponding pixel electrode, so that the pixel electrode in the sub-pixel has a voltage of corresponding amplitude. In the embodiment, the pixel electrode of the sub-pixel is placed in parallel with the adjacent common electrode line to form a liquid crystal capacitor and a storage capacitor. Due that a voltage difference exists between the pixel electrode and the common electrode line and that the liquid crystal capacitor stores the charge, and the liquid crystal capacitor can provide a deflection voltage to the corresponding liquid crystal molecules, and the storage capacitor provides the corresponding voltage to the liquid crystal capacitor to maintain the normal working state of the liquid crystal capacitor for a long period. When the liquid crystal molecule is applied with the deflection voltage, due to the "electric dipole moment" phenomenon, the intensity and direction of the electric field of the liquid crystal molecules will change, and the deflection angle of the liquid crystal molecules will also change. The light intensity and viewing angle of the light source emitted from a backlight passing through the liquid crystal molecule layer will also fluctuate, and the multiple sub-pixels in the display panel can present different images/videos. Therefore, this embodiment combines the voltage difference between the sub-pixel and the common electrode line to adjust the screen display effect in the display panel, thus, the operation is simple and the pictures displayed in the display panel can bring users good visual experience.

As an optional embodiment, in the above-described array substrate, in the same column of sub-pixels, all sub-pixels have the same color. Exemplarily, the first column of sub-pixels are red, the second column of sub-pixels are green, and the third column of sub-pixels are blue, the arrangement of which are repeated likewise. By controlling the light-emitting state of each column of sub-pixels, multiple sub-pixels can be mixed in polarity to emit light sources of different levels. In the same column of sub-pixels, adjacent sub-pixels in the vertical direction have the same power supply polarity to reduce the scan driving cost of multiple sub-pixels in this embodiment, and improve the coordination performance between different sub-pixels.

Exemplarily, two sub-pixels adjacent in the vertical direction are defined as a first sub-pixel and a second sub-pixel. The first sub-pixel includes: a first pixel electrode and a first switch tube, and the second sub-pixel includes: a second pixel electrode and a second switch tube. The first switch tube and the second switch tube are connected to the same data line D. The first switch tube and the second switch tube are connected to different scanning lines G, therefore, the on and off state of the first sub-pixel and the second sub-pixel can be respectively controlled by different scanning signals to enable the first sub-pixel and the second sub-pixel to be in different working states. The light-emitting states of the first sub-pixel and the second sub-pixel can be simultaneously controlled by the same path of scanning signals. Likewise, in the same column of sub-pixels, the adjacent sub-pixels are introduced with the same data signals to maintain the normal light-emitting state, such that different sub-pixels in the array substrate 10 can corporately work to display more complete and dynamic pictures, the picture display status of the in the display panel has better maneuverability.

Combining with the working principle of the array substrate 10 in FIG. 1 and FIG. 2, since the scanning line G in the array substrate 10 adopts a bidirectional driving mode, when the scanning signal is connected to both ends of the scanning line G, in the scanning signal transmission process, because a large transmission delay exists in the transmission path of the scanning signal in the horizontal direction, which will cause a large error in the transmission process of the scanning signal, particularly, mutual charging phenomenon exists in the vicinity of the middle data line of the array substrate 10. Such phenomenon of mutual charging of scanning signals will greatly affect the image display quality in the display panel and reduce the user's visual experience.

In order to improve the quality of the picture display in the display panel, technicians usually need to detect the severity of the mischarge of the display panel. Referring to the structure of the array substrate 10 in FIG. 1 and FIG. 2, the integration of multiple scanning lines in the array substrate 10 is relatively high, and in the actual industrial application process, the width of the scanning line G is extremely small. Generally, the width of the scanning line G is less than or equal to 30 µm. The width of the detection device in the exemplary technology is several orders of magnitude larger than the width of the scanning line G. Exemplarily, the width of the detection device in the exemplary technology is generally 100 µm. It is difficult for the traditional detection device is to collect the scanning signal of the scanning line G, and the exemplary technology cannot accurately detect the mischarge degree in the array substrate, resulting in poor quality of the picture display in the display panel. Based on this, the present application provides a method for detecting mischarge of the array substrate 10, by means of the mischarge detection method, technicians can accurately obtain the scanning signal through the traditional detection device, thus realizing accurate monitoring and detection of the mischarge degree in the display panel and improving the display quality of multiple sub-pixels.

Figure 3:
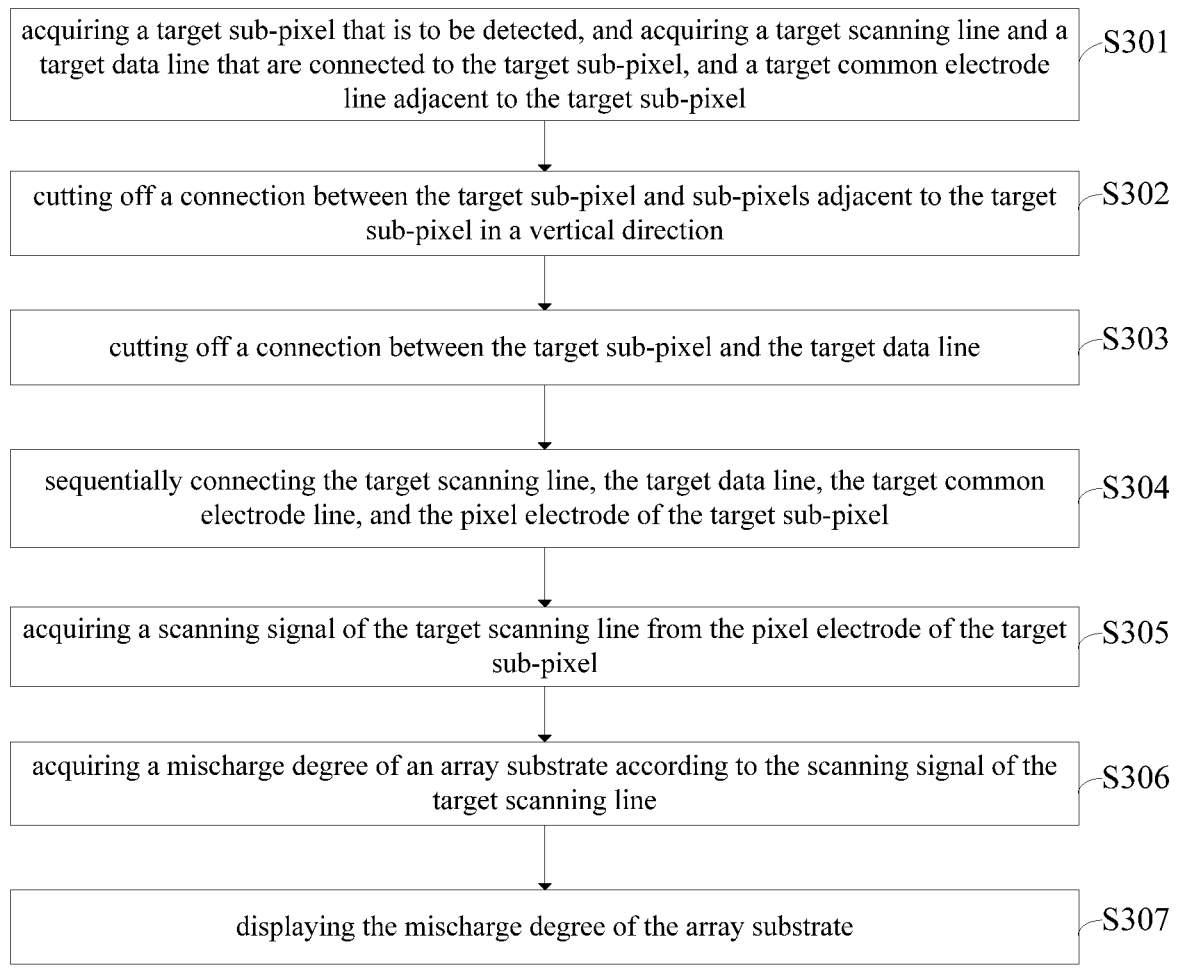
FIG. 3 is a flow chart of a mischarge detection method provided by an embodiment of the present application.

FIG. 3 shows specific implementation steps of the mischarge detection method provided by this embodiment. The mischarge detection method is applied to the array substrate 10, and the structure and the working principle of the array substrate 10 can be referred to the above-described embodiments in FIGS. 1 and 2, which will not be repeated herein. It should be noted that the array substrate 10 shown in FIG. 1 and FIG. 2 is only an embodiment of the object applying such method, which does not mean that the mischarge detection method in this application is only applicable to the array substrate 10 shown in FIGS. 1-2. On the basis of not violating the essential operation steps of the mischarge detection method in the present application, those skilled in the art can make expansion, extension, and deformation on the basis of the array substrate 10 shown in FIGS. 1-2. Since this only relates to the improvement of the object applicable to the mischarge detection method of the embodiments, and does not involve the essential technical content of each specific operation step of the mischarge detection method provided by the embodiments, the mischarge detection method provided by the embodiments of the present application can still be applied to the above-described different types of array substrates.

As shown in FIG. 3, the mischarge detection method provided by the embodiment comprises:

Step S301, acquiring a target sub-pixel that is to be detected, and acquiring a target scanning line and a target data line that are connected to the target sub-pixel, and a target common electrode line adjacent to the target sub-pixel.

In combination with FIGS. 1-3, the mischarge degree of the array substrate can be accurately reflected by the target sub-pixel, and the working state of the target sub-pixel can be controlled by the target scanning line and the target data line. When the pixel electrode of the target sub-pixel is applied with a voltage, a deflection voltage exists between the target common electrode line and the pixel electrode of the target sub-pixel, thereby realizing the image/video display function of the display panel. As an optional embodiment, as shown in FIGS. 1-2, the target sub-pixel in this embodiment is located near a middle data line of the array substrate.

Step S302, cutting off a connection between the target sub-pixel and sub-pixels adjacent to the target sub-pixel in a vertical direction.

Step S303, cutting off a connection between the target sub-pixel and the target data line.

In this embodiment, by cutting off the physical connection between the target sub-pixel and the adjacent sub-pixels in the vertical direction, it is possible to avoid the adjacent sub-pixels from interfering with the mischarge detection process of the target sub-pixel. Similarly, by cutting off the physical connection between the target sub-pixel and the target data line, it is possible to avoid the data signal on the target data line from interfering with the mischarge detection process of the target sub-pixel. Therefore, in step S302 and step S303, the target sub-pixel is isolated from external noises, which is beneficial to accurately detect the mischarge degree of the target sub-pixel, and to reduce the mischarge detection error of the array substrate 10.

Optionally, in this embodiment, step S302 may be carried out before or after step S303, which is not limited herein.

Step S304, sequentially connecting the target scanning line, the target data line, the target common electrode line, and the pixel electrode of the target sub-pixel.

In step S304, the scanning signal of the target scanning line can be transferred to the pixel electrode of the target sub-pixel through the target data line and the target common electrode line sequentially. Since the width of the pixel electrode of the target sub-pixel is greater than the width of the target scanning line, technicians may accurately acquire the scanning signal from the pixel electrode of the target sub-pixel through a detection device, thereby realizing the accurate detection of the mischarge degree of the array substrate 10.

Step S305, acquiring a scanning signal of the target scanning line from the pixel electrode of the target sub-pixel.

Step S306, acquiring a mischarge degree of an array substrate according to the scanning signal of the target scanning line.

As mentioned above, technicians can obtain the scanning signal of the target scanning line in real time through the pixel electrode of the target sub-pixel, and accurately obtain the mischarge degree of the array substrate by the scanning signal. In this way, the precise detection and monitoring of the mischarge degree of the array substrate is achieved, and in turn the mischarging phenomenon of the scanning signal in the array substrate is prevented from seriously degrading the image display quality of the display panel. In this embodiment, technicians can quickly and accurately know the mischarge degree of the array substrate, which has high practical value.

Step S307, displaying the mischarge degree of the array substrate.

In step S307, the technician can intuitively observe the mischarge degree of the array substrate to obtain the scan driving state of each sub-pixel in the array substrate, which ensures the safe and stable operation of the array substrate. Therefore, this embodiment can directly display the mischarge degree of the array substrate, and the mischarge detection method has extremely high human-computer interaction performance. When the technicians obtain the mischarge degree of the array substrate, the adverse influence of the mischarge of the array substrate on the picture quality of the display panel can be completely avoided, thus, the mischarge detection method in this embodiment has higher universality.

In the mischarge detection method shown in FIG. 3, according to the detection result of the mischarge degree of the target sub-pixel, the mischarge degree of the array substrate can be accurately obtained, and the operation is simple. By isolating the target sub-pixel from the adjacent sub-pixels in the vertical direction and isolating the target sub-pixel from the target data line, the target sub-pixel is prevented from being interfered by external noises during the mischarge detection process, which improves the mischarge detection accuracy of the mischarge detection method in this embodiment. The scanning signal of the scanning line is sequentially transferred to the pixel electrode of the target sub-pixel. Since the width of the pixel electrode of the target sub-pixel is much greater than the width of the scanning line, the technicians can accurately detect the scanning signal at the pixel electrode of the target sub-pixel by using the detection apparatus in the exemplary art, the mischarge degree of the array substrate can be determined according to the scanning signal, in this way, the detection accuracy for the mischarge degree of the array substrate can be greatly improved by using the mischarge detection method of this embodiment, thereby ensuring the quality of image displayed on the display panel. In the meanwhile, the mischarge detection method according to embodiments of the present application may also directly display the mischarge degree of the array substrate, which allows the technicians to intuitively obtain the mischarge degree of the array substrate, bringing the technicians good user experiences and having higher practical value, therefore, it can be effectively solved the technical problem that the exemplary technology cannot accurately detect the mischarge degree of the array substrate, causing poor picture quality of the display panel and poor visual experience of the user.

Figure 4:
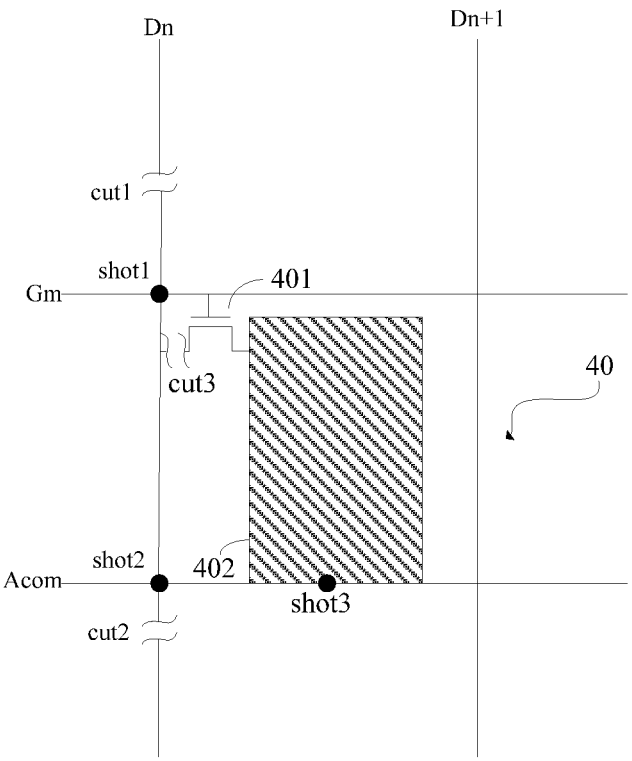
FIG. 4 is a structure diagram of a target sub-pixel provided by an embodiment of the present application.

In order to better explain the step of detecting the mischarge of the target sub-pixel in this embodiment, FIG. 4 shows the structure diagram of the target sub-pixel 40 provided in this embodiment. As shown in FIG. 4, the target sub-pixel 40 is connected with the target data line Dn and the target scanning line Gm, and the scan driving process of the target sub-pixel 40 is realized through the scanning signal and the data signal. Specific operation steps of the mischarge detection method in this embodiment will be described hereinbelow in combination with FIG. 4.

As an optional embodiment, the above step S302 specifically comprises:

selecting a first breakpoint cut1 and a second breakpoint cut2 on the target data line Dn, where the first breakpoint cut1 is located between the first intersection and the second intersection, and the second breakpoint cut2 is located between the first intersection and the third intersection.

The first breakpoint cut1 does not overlap with either the first intersection or the second intersection, and the second breakpoint cut2 does not overlap with either the first intersection or the third intersection.

The first intersection is a projection point of the target scanning line Gm projected onto the target data line Dn. The sub-pixels adjacent to the target sub-pixel 40 in the vertical direction are a first sub-pixel and a second sub-pixel, the first sub-pixel is located on one side of the target sub-pixel 40, and the second sub-pixel is located on the other side of the target sub-pixel 40. The first sub-pixel is connected with a first scanning line and the target data line Dn, and the second sub-pixel is connected with a second scanning line and the target data line Dn. The second intersection is a projection point of the first scanning line projected onto the target data line Dn, and the third intersection is a projection point of the second scanning line projected onto the target data line Dn;

The target data line Dn is cut off at the first breakpoint cut1, and the target data line Dn is cut off at the second breakpoint cut2.

Referring to FIGS. 1-4, because in the array substrate, the first sub-pixel, the target sub-pixel 40, and the second sub-pixel are sequentially adjacent in the vertical direction, and these three sub-pixels (the first sub-pixel, the target sub-pixel 40, and the second sub-pixel) use the same power supply polarity method to drive the working state of these three sub-pixels at the same time through the same data signal, and control the light-emitting state of each sub-pixel through different scanning signals. In this embodiment, when the target data line Dn is cut off at the first breakpoint cut1, the target sub-pixel 40 is disconnected from the first sub-pixel; and when the target data line Dn is cut off at the second breakpoint cut2, the target sub-pixel 40 is disconnected from the second sub-pixel. In the process of detecting the mischarge of the target sub-pixel 40, the adjacent sub-pixels in the vertical direction are prevented from interfering with the mischarge detection of the target sub-pixel, which improves the accuracy of acquiring the scanning signal of the target scanning line Gm.

At the same time, in this embodiment, the data line Dn is cut off at the two breakpoints (the first breakpoint cut1 and the second breakpoint cut2) in order to cut off the physical connection between the target sub-pixel and the adjacent sub-pixels, which features simple operation, low cost, greatly simplifies the operation steps of the mischarge detection method in this embodiment, and reduces the mischarge detection cost of the array substrate. Technicians can more conveniently detect the mischarge degree of the array substrate, and the method has a wider application range.

As an optional embodiment, the target sub-pixel 40 comprises: a first pixel electrode 402 and a first switch tube 401, in which, a first conduction terminal of the first switch tube 401 is connected with the target data line Dn, a second conduction terminal of the first switch tube 401 is connected with the first pixel electrode 402, and a control terminal of the first switch tube 401 is connected with the target scanning line Gm. The step S303 particularly comprises:

cutting off the connection between the first conduction terminal of the first switch tube 401 and the target data line Dn.

In this embodiment, the scanning signal is output by the target scanning line Gm to the control terminal of the first switch tube 401, and the first switch tube 401 can be controlled to be turned on or off by the scanning signal. If the first switch tube 401 is turned on, the target data line Dn transmits the data signal sequentially through the first conduction terminal of the first switch tube 401 and the second conduction terminal of the first switch tube 401 to the first pixel electrode 402, in this way, the scan driving process of the target sub-pixel can be realized by the target scanning line Gm and the target data line Dn. During the process of detecting the mischarge of the target sub-pixel 40, by disconnecting the physical connection between the first switch tube 401 and the target data line Dn, the data signal of the target data line Dn is prevented from interfering the process of detecting the mischarge of the target sub-pixel 40, therefore, the first switch tube 401 is electrically isolated from the target data line Dn in this embodiment, which ensures the independence of source of the signal in the target sub-pixel 40, improves the detection accuracy of the mischarge degree of the array substrate in this embodiment, and avoids the detection error caused by the external noises.

As an optional embodiment, the target sub-pixel 40 comprises: a first pixel electrode 402 and a first switch tube 401, in which, a first conduction terminal of the first switch tube 401 is connected with the target data line Dn, a second conduction terminal of the first switch tube 401 is connected with the first pixel electrode 402, and a control terminal of the first switch tube 401 is connected with the target scanning line Gm. The step S303 particularly comprises:

cutting off the connection between the second conduction terminal of the first switch tube 401 and the first pixel electrode 402.

Referring to the structure of the target sub-pixel in FIG. 4, the first pixel electrode 402 of the target sub-pixel 40 is introduced with the data signal and scanning signal via the first switch tube 401, when the connection between the second conduction terminal of the first switch tube 401 and the first pixel electrode 402 is cut off, the first pixel electrode 402 is completely disconnected from the scanning line and the data line. As an independent power device, the first pixel electrode 402 of the target sub-pixel 40 can completely prevents external interference signals from causing errors in the mischarge detection result of the target sub-pixel 40. In the process of detecting the mischarge degree in the target sub-pixel 40, scanning signals of the pixel electrode of the target sub-pixel 40 are all derived from the target scanning line Gm, which guarantees the reliability of the detection result of the mischarge degree of the array substrate in this embodiment, and the mischarge detection method in the embodiment of this application has a wider application range.

Figure 5:
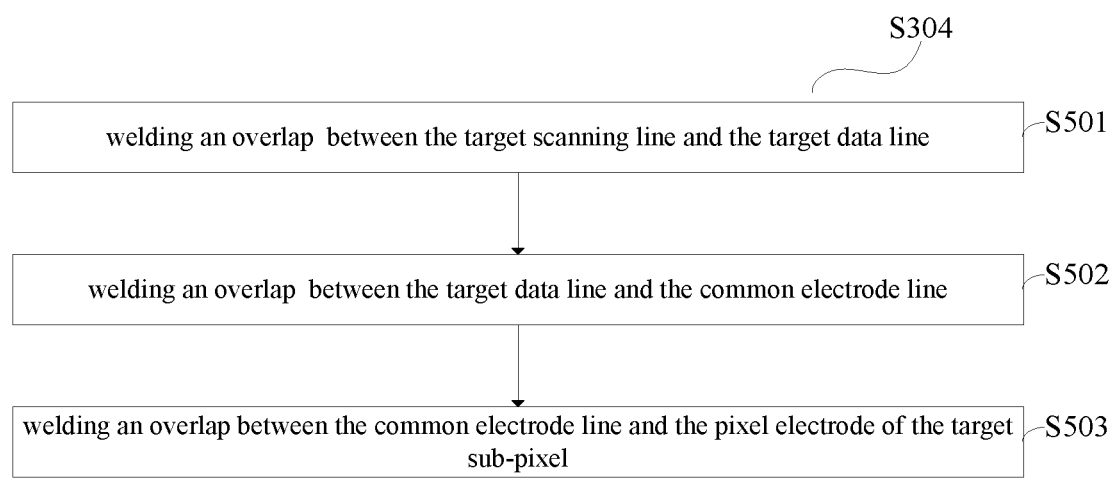
FIG. 5 is a flow chart of specific operation for connecting different transmission lines provided by an embodiment of the present application.

As an optional embodiment, particular operations of the above step S304 provided by this embodiment shown in FIG. 5 are as follows:

Step S501: welding an overlap shot1 between the target scanning line Gm and the target data line Dn;

Step S502: welding an overlap shot2 between the target data line Dn and the common electrode line Acom; and Step S503: welding an overlap shot3 between the common electrode line Acom and the pixel electrode 402 of the target sub-pixel 40.

It should be noted that, in this embodiment, step S501, step S502, and step S503 have no sequence. Those skilled in the art can adjust the sequence of step S501, step S502, and step S503 according to actual needs. Exemplary, the specific operation sequence of step S304 in this embodiment is: step S501-step S502-step S503.

As an optional embodiment, a solder is printed at the overlap shot1 between the target scanning line Gm and the target data line Dn to cover the overlap shot1 between the target scanning line Gm and the target data line Dn with a solder paste and to connect the target scanning line Gm with the target data line Dn via the solder paste, such that the target scanning line Gm and the target data line Dn can be electrically connected via the solder paste, and data communication can be directly interconnected therebetween to achieve bidirectional data transmission. Similarly, in step S502, the solder is printed at the overlap shot2 between the target data line Dn and the common electrode line Acom to cover the overlap shot2 between the target data line Dn and the common electrode line Acom with a solder paste and to connect the target data line Dn with the common electrode line Acom via the solder paste, such that the electrical connection between the target data line Dn and the common electrode line Acom can be achieved. Similarly, the solder is printed at the overlap shot3 between the common electrode line Acom and the pixel electrode 402 of the target sub-pixel 40 to cover the overlap shot3 between the common electrode line Acom and the pixel electrode 402 of the target sub-pixel 40 with a solder paste and to connect the common electrode line Acom and the pixel electrode 402 of the target sub-pixel 40 via the solder paste. In step S503, the common electrode line Acom and the pixel electrode 402 of the target sub-pixel 40 can directly perform bidirectional data communication.

Therefore, in this embodiment, the target scanning line Gm, the target data line Dn, the common electrode line Acom, and the pixel electrode 402 of the target sub-pixel 40 on the array substrate can be directly communicated and interconnected, and the scanning signals can be transferred via different transmission lines. The target signals can be transferred from the target scanning line Gm to the pixel electrode 402 of the target sub-pixel 40 through the target data line Dn, the common electrode line Acom sequentially, which avoids the energy consumption of the scanning signal in the transmission process. The pixel electrode 402 of the target sub-pixel 40 can accurately obtain the scanning signal. In the process of detecting the mischarge of the array substrate, the pixel electrode 402 of the target sub-pixel 40 can directly obtain the scanning signal, and then the mischarge degree of the target sub-pixel 40 can be obtained from the scanning signal. Since the pixel electrode 402 in the target sub-pixel 40 has a larger width, technicians can use a traditional detection device to obtain the scanning signal in detect pixel electrode 402 of the target sub-pixel 40 in real time, which improves the detection error of the mischarge degree of the target sub-pixel. The mischarge detection method in this embodiment has better simplicity.

As an optional embodiment, the step S305 particularly comprises:

contacting a microscope probe with the pixel electrode 402 of the target sub-pixel 40 to acquire the scanning signal of the target scanning line Gm.

As a signal detection device, the microscope probe can collect the weak signal on the measured object, and the detection sensitivity of the signal is extremely high; and the microscope probe has a very small volume, and the microscope probe can be utilized to acquire signal from objects with very small area in order to acquire the weak change in the signal from the test object. In this embodiment, since the pixel electrode 402 of the target sub-pixel 40 has been connected to the scanning signal from the target scanning line Gm, and the pixel electrode 402 of the target sub-pixel 40 has a greater width than the target scanning line Gm, the technicians can accurately and quickly pierce the microscope probe into the pixel electrode 402 of the target sub-pixel 40, and then the microscope probe in this embodiment can quickly detect the scanning signal of the pixel electrode 402 of the target sub-pixel 40, and the mischarge degree of the array substrate can be accurately obtained according to the scanning signal. Therefore, in this embodiment, a microscope probe is used to contact the pixel electrode 402 in the target sub-pixel 40 to quickly obtain the scanning signal of the target scanning line Gm, which guarantees the accuracy of detecting the mischarge of the array substrate, effectively solves the problem that the exemplary technology cannot accurately detect the scanning signal at the scanning line G on the array substrate and therefore has the poor accuracy in detecting the mischarge of the array substrate.

Figure 6:
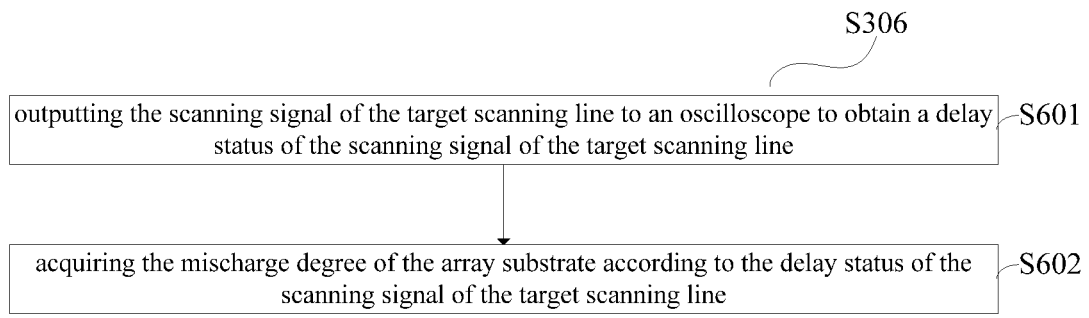
FIG. 6 is a flow chart of specific operation for obtaining a mischarge degree according to a scanning signal provided by an embodiment of the present application.

As an optional embodiment, FIG. 6 shows the specific operation steps of the above step S306 provided in this embodiment, which is carried out as follows:

S601, outputting the scanning signal of the target scanning line Dn to an oscilloscope to obtain a delay status of the scanning signal of the target scanning line Dn; and In combination with FIGS. 1-6, because the mischarging phenomenon in the array substrate is caused by the transmission delay of the scanning signal, in step S601, the scanning signal is output to the oscilloscope, and the oscilloscope can analyze and display a curve showing the amplitude change of the scanning signal over time, thereby obtaining the phase, frequency, and amplitude parameters of the scanning signal during the bidirectional driving process. In this embodiment, the oscilloscope can accurately obtain the delay status of the scanning signal, avoiding the detection error of the scanning signal of the target scanning line Dn. The curve of the scanning signal waveform change displayed on the oscilloscope can accurately reflect the scan driving state of the target sub-pixel, and the detection accuracy is extremely high.

S602, acquiring the mischarge degree of the array substrate according to the delay status of the scanning signal of the target scanning line Dn.

As mentioned above, after analyzing and processing the delay status of the scanning signal of the target scanning line Dn, the mischarge degree of the array substrate can be accurately obtained, which is easy to operate and timely prevents the mischarge of the array substrate from seriously degrading the display panel. Therefore, this embodiment can accurately obtain the mischarge degree of the array substrate through the oscilloscope, which speeds up the detection rate of the mischarge phenomenon in the array substrate by the mischarge detection method in this embodiment, greatly improves the detection accuracy of the mischarge degree in the substrate, and has extremely high practical value.

As an optional embodiment, step S307 particularly comprises:

displaying the mischarge degree of the array substrate on the oscilloscope.

Referring to the above embodiment of FIG. 6, the waveform change curve of the scanning signal in the target scanning line Dn can be displayed in the oscilloscope in real time to obtain the delay status of the scanning signal accordingly. In step S307, the technicians can directly observe the mischarge degree of the array substrate in the oscilloscope, and the user can directly know the delay status of the scanning signal in the array substrate and the scan driving process of each sub-pixel. Therefore, in this embodiment, The utilization of the oscilloscope greatly improves the human-computer interaction performance of the mischarge detection method, and comprehensively guarantees the safe and stable operation of the array substrate.

As an optional embodiment, step S307 particularly comprises:

displaying the mischarge degree of the array substrate in an external display panel.

In the embodiment of the present application, the external display panel is connected to the oscilloscope. When the oscilloscope obtains the mischarge detection result of the array substrate according to the scanning signal of the target scanning line Dn, and transmits the mischarge detection result of the array substrate to the external display panel, the user can directly observe the mischarge degree of the array substrate on the external display panel. The mischarge detection method in this embodiment has high compatibility, and the mischarge detection result of the array substrate can be intuitively provided to the technicians via the external display panel, thereby improving the technician's experience.

As an optional embodiment, the step 301 particularly comprises:

acquiring the target sub-pixel to be detected according to an operation command from a user, and acquiring the target scanning line and the target data line that are connected to the target sub-pixel, and the target common electrode line adjacent to the target sub-pixel.

Referring to the specific embodiments of FIGS. 1 to 3, in the embodiment of the present application, the operation instructions include user operation information, and the user can directly control the process for the mischarge detection of the array substrate through the operation instructions, such mischarge detection process has high human-computer interaction performance. Therefore, in step S301, the corresponding target sub-pixel in the array substrate can be selected according to the actual functional requirements of the user to ensure that the selected target sub-pixel can accurately represent the mischarge degree of the array substrate, by detecting the mischarge degree of the target sub-pixel, the difference in the transmission delay of the scanning signal in the array substrate can be obtained. Therefore, the mischarge detection method in this embodiment has better maneuverability, improves the accuracy in the mischarge detection of the array substrate, and has high practical value.

As an optional embodiment, after the step S306, the mischarge detection method further comprises:

sending out a fault alarm signal if the mischarge degree of the substrate array is greater than a safe operation range of the substrate array.

Exemplarily, the safe operation range of the above-described array substrate is preset by the technicians, and is related to the internal circuit structure of the array substrate and its manufacturing materials. Only when the actual mischarge degree of the array substrate is less than or equal to safe operation range of the array substrate, the sub-pixels in the array substrate can be in a safe and stable working state.

The mischarge detection method described in the above can detect the mischarge degree of the array substrate in real time, which has a great influence on the display quality of the display panel. Exemplarily, if the transmission delay of the scanning signal in the array substrate is too large, the mischarge of the array substrate is extremely serious, which will greatly reduce the picture quality in the display panel, and the user experience is poor. In this embodiment, the mischarge degree of the array substrate is compared with the safe operation range of the array substrate. If the mischarge degree of the array substrate is greater than the safe operation range of the array substrate, it means that the mischarge degree of the array substrate is too large, and the transmission delay of the scanning signal in the array substrate is too large. In this case, the fault alarm signal is sent to the technicians in order to prompt that the mischarge degree of the scanning signal in the array substrate is too large, and the scan driving process of the sub-pixels in the array substrate needs to be adjusted in real time. When the technician receives the fault alarm signal, corresponding measures can be taken to solve the problem that the mischarge degree in the array substrate is too large, and to improve the picture quality of the display panel. Therefore, in this embodiment, the fault alarm signal can prevent the mischarge in the array substrate from adversely affecting the picture quality in the display panel in time, thereby ensuring the safe and stable operation of the array substrate and the picture display effect in the display panel.

As an optional embodiment, after the step S306, the mischarge detection method further comprises:

sending out a safe operation signal if the mischarge degree of the substrate array is small than or equal to the safe operation range of the substrate array.

After the mischarge degree of the array substrate is obtained by using the mischarge detection method in the embodiment of the present application, if the actual mischarge degree of the array substrate is less than or equal to the safe operation range of the array substrate, it means that all the sub-pixels in the array substrate are in safe and stable scanning drive process, the display panel can display a normal and complete picture. It such condition, it is prompt via the safe operation signal to the technicians that the array substrate is in normal operation state, and all sub-pixels in the array substrate are in stable and safe working state in a long period. Exemplarily, the safe operation signal is an acousto-optic prompt signal, which prompts normal operation information of the array substrate through the sound or the light source, which improves the application range and practical value of the mischarge detection method.

Therefore, in this embodiment, regardless of whether or not the transmission delay process of the scanning signal in the array substrate is in the safe operation range, the fault alarm signal or the safe operation information is used to promptly send the mischarging state of the array substrate, and the technician can accurately know mischarge degree of sub-pixels in the array substrate in real time, which greatly guarantees the work safety performance of all sub-pixels in the array substrate. All sub-pixels in the array substrate can realize fast scanning and driving functions, which brings better user experience to the technicians.

As an optional embodiment, in step S301, after acquiring the target sub-pixel to be detected, the mischarge detection method further comprises:

detecting structure parameters of the target sub-pixel.

As an optional embodiment, the structure parameters of the target sub-pixel comprise:

a shape and an area of the target sub-pixel.

Referring to the specific embodiments shown in FIG. 3, the mischarge degree of the target sub-pixel can accurately represent the mischarge degree of the array substrate. If the mischarge degree of the target sub-pixel has a large detection error, the mischarge detection method is difficult to accurately obtain the real transmission delay of the scanning signal in the array substrate. By performing real time detection on the shape and area of the target sub-pixel, it is possible to determine whether the mischarge degree of the target sub-pixel is representative. Therefore, the mischarge detection method in this embodiment can accurately obtain the mischarge degree of the array substrate through the target sub-pixel, thus improving the detection accuracy of the mischarge detection method and avoiding the systematic errors produced during the process of detecting the mischarge degree of the array substrate.

As an optional embodiment, the target sub-pixel 40 is any one of a read sub-pixel, a green sub-pixel, and a blue sub-pixel.

Since in step S301, the mischarge degree of the array substrate can be obtained by detecting the mischarge degree of the target sub-pixel 40, and the array substrate includes sub-pixels of multiple colors, in the cyclic scan process of the array substrate, mixed color pictures of different sub-pixels present a dynamic and complete image/video. In this embodiment, the target sub-pixel 40 to be detected can be any one of three color sub-pixels (red sub-pixel, green sub-pixel, and blue sub-pixel), and the target sub-pixel 40 in this embodiment has a strong representativeness. The mischarge degree of the target sub-pixel 40 can represent the mischarge degree of all the sub-pixels in the array substrate, which not only simplifies the operation steps of the mischarge detection method, but also improves the detection accuracy of the mischarge detection method, thereby being simple and feasible.

Figure 7:
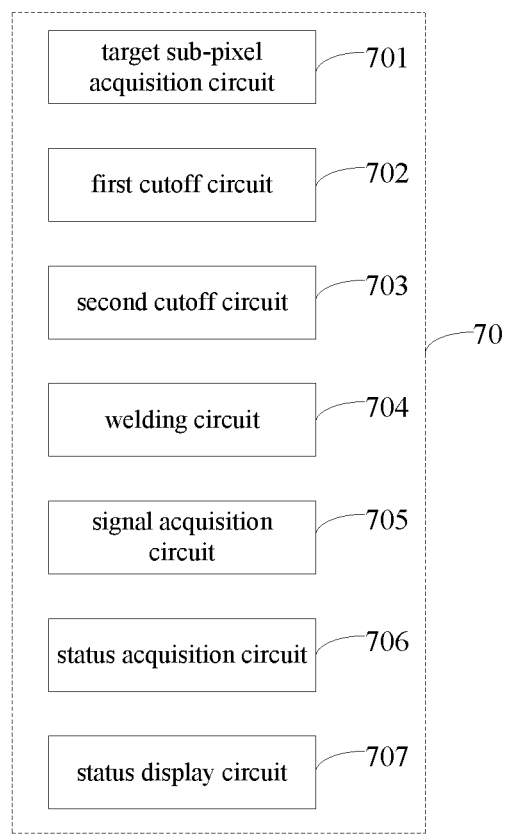
FIG. 7 is a structure diagram of a mischarge detection apparatus provided by an embodiment of the present application.

FIG. 7 shows the structure of the mischarge detection apparatus 70 provided by this embodiment, in which, the mischarge detection apparatus 70 is applied to an array substrate, and the array substrate includes: multiple data lines arranged in an array in a horizontal direction, multiple scanning lines arranged in an array in a vertical direction, multiple common electrode lines arranged in an array in the vertical direction, and multiple sub-pixels arranged in an array. Each sub-pixel is defined by intersections of data lines and scanning lines, and includes a pixel electrode and a switch tube. The pixel electrode is connected to the data line and the scanning line through the switch tube, and the multiple common electrode lines and the multiple data lines are arranged in the same layer. The mischarge detection apparatus comprises a target sub-pixel acquisition circuit 701, a first cutoff circuit 702, a second cutoff circuit 703, a welding circuit 704, a signal acquisition circuit 705, a status acquisition circuit 706, and a status display circuit 707.

The target sub-pixel acquisition circuit 701 is configured for acquiring a target sub-pixel that is to be detected, and acquiring a target scanning line and a target data line that are connected to the target sub-pixel, and a target common electrode line adjacent to the target sub-pixel;

The first cutoff circuit 702 is configured for cutting off a connection between the target sub-pixel and sub-pixels adjacent to the target sub-pixel in a vertical direction;

The second cutoff circuit 703 is configured for cutting off a connection between the target sub-pixel and the target data line;

The welding circuit 704 is configured for sequentially connecting the target scanning line, the target data line, the target common electrode line, and the pixel electrode of the target sub-pixel;

The signal acquisition circuit 705 is configured for acquiring a scanning signal of the target scanning line from the pixel electrode of the target sub-pixel;

The status acquisition circuit 706 is configured for acquiring a mischarge degree of an array substrate according to the scanning signal of the target scanning line; and The status display circuit 707 is configured for displaying the mischarge degree of the array substrate.

As an optional embodiment, the signal acquisition circuit 705 comprises: a microscope probe.

The microscope probe is configured for contacting the pixel electrode of the target sub-pixel to acquire the scanning signal of the target scanning line As an optional embodiment, the status display circuit 707 comprises: an oscilloscope.

The oscilloscope is configured for receiving the scanning signal of the target scanning line, and displaying the mischarge degree of the array substrate according to the scanning signal of the target scanning line.

Since the structure of the mischarge detection apparatus 70 shown in FIG. 7 corresponds to the mischarge detection method shown in FIGS. 3-6, the specific embodiments of the various circuit structures and electronic components in the mischarge detection apparatus 70 shown in FIG. 7 may refer to the embodiments in FIG. 1 to FIG. 6, which will not be repeated here.

It should be noted that the target pixel acquisition circuit 701, the first cutoff circuit 702, the second cutoff circuit 703, the welding circuit 704, and the state acquisition circuit 706 in the mischarge detection apparatus 70 in FIG. 7 may adopt circuit structure and electronic components in the exemplary technology, which are not limited herein. Exemplarily, the target pixel acquisition circuit 701 can be realized by using a detector in the exemplary technology. The technician can select different circuits in the exemplary technologies according to actual needs to implement the circuit structures in the above-described mischarge detection apparatus 70.

Therefore, in the mischarge detection apparatus 70 shown in FIG. 7, the target sub-pixel can be isolated from the adjacent sub-pixels in the vertical direction and the target data line by the first cutoff circuit 702 and the second cutoff circuit 703, thereby avoiding the interference caused by external noise on the mischarge detection of the target sub-pixel. Because the pixel electrode of the target sub-pixel has a wider width than the target scanning line, the signal acquisition circuit 705 can be used to quickly and accurately acquires the scanning signal from the pixel electrode of the target sub-pixel, and the state acquisition circuit 706 can accurately acquire the mischarge degree of the array substrate according to the scanning signal, which is easy to operate and improves the detection accuracy of the mischarge degree in the target sub-pixel. In addition, the status display circuit 707 can display the mischarge degree of the array substrate in real time, such that the technician can intuitively know the mischarge degree of the array substrate through the mischarge detection apparatus 70, thereby being convenient. Thus, the mischarge detection apparatus 70 in this embodiment can detect the mischarge degree of the array substrate in a real time and accurate manner, with small detection errors, which can prevent the mischarge in the array substrate from causing poor picture quality in the display panel. The mischarge detection apparatus 70 can be widely applied to different types of display panels, in order to improve the quality of the picture display in the display panel and enhance the user's visual experience. In this way, it is effectively solved the problem that the exemplary technology cannot accurately detect the mischarge degree in the array substrate, which leads to poor picture quality in the display panel and low practical value.

Figure 8:
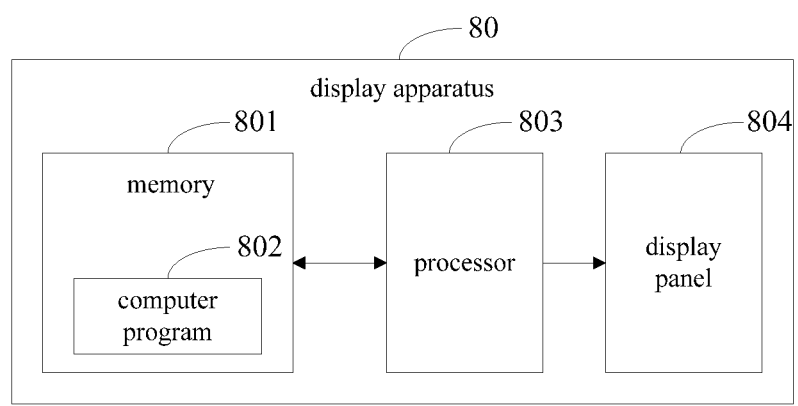
FIG. 8 is a structure diagram of a display apparatus provided by an embodiment of the present application.

A structure of a display apparatus provided by an embodiment of the present application is shown in FIG. 8. The display apparatus as shown in FIG. 8 comprises: a memory 801, a processor 803, and a computer program 802 stored in the memory 801 and configured for running on the processor 803. The display apparatus 80 further comprises a display panel 804, and the display panel 804 comprises a plurality of sub-pixels arranged in an array, and each sub-pixel is defined by intersections of scanning lines and data lines. The processor 803 is configured for implementing a mischarge detection method when executing the computer program 802.

The mischarge detection method comprises:

acquiring a target sub-pixel that is to be detected, and acquiring a target scanning line and a target data line that are connected to the target sub-pixel, and a target common electrode line adjacent to the target sub-pixel;

cutting off a connection between the target sub-pixel and sub-pixels adjacent to the target sub-pixel in a vertical direction;

cutting off a connection between the target sub-pixel and the target data line;

sequentially connecting the target scanning line, the target data line, the target common electrode line, and the pixel electrode of the target sub-pixel;

acquiring a scanning signal of the target scanning line from the pixel electrode of the target sub-pixel;

acquiring a mischarge degree of an array substrate according to the scanning signal of the target scanning line; and displaying the mischarge degree of the array substrate.

Referring to specific embodiments shown in FIGS. 1-6, the display apparatus 80 in this embodiment detects the mischarge degree of the target sub-pixel to obtain the mischarge degree in the display panel 804. The detection accuracy is extremely high, and technicians can know the mischarge degree of the display apparatus 80 in real time, the quality of picture display in the display apparatus 80 is improved, bringing the user good visual experience, and it is prevented the mischarge degree of multiple sub-pixels in the display apparatus 80 from exceeding the safe operation range. In addition, the display apparatus 80 in this embodiment implements the mischarge detection function of the array substrate through the computer program 802 pre-stored in the memory 801, which is easy to operate, improves the accuracy in the detection of the difference in the transmission delay of the scanning signal in the display panel 804, and ensures the working stability of the display apparatus 80, so that the display apparatus 80 in the embodiment of the present application can be applied to different industrial fields and has a very high application range. In this way, it is effectively solved the problem that the exemplary technology cannot detect the mischarge degree of the display apparatus in a real time and accurate manner, resulting relatively large mischarge degree in the display apparatus, unclear picture display and low quality of the picture in the display panel, and difficulties in realizing universal application.

The so-called processor 803 may be a central processing unit (CPU), and may also be other general-purpose processors, digital signal processors (DSP), application specific integrated circuits (ASIC), ready-made programmable gate array (field-programmable gate array, FPGA) or other programmable logic devices, discrete gates, or transistor logic devices, and discrete hardware components, etc., and may also be a screen driver board (timing controller) of the display apparatus.

The memory 801 may be an internal storage unit of the display apparatus 80, such as a hard disk or a memory of the display apparatus 80. The memory 801 may also be an external storage device of the display apparatus 80, such as a plug-in hard disk, a smart memory card (SMC), a secure digital (SD), and a flash card equipped on the display apparatus 80. Further, the memory 801 may also include both an internal storage unit of the display apparatus 80 and an external storage device. The memory 801 is configured to store the computer program and other programs and data required by the display panel. The memory 801 can also be configured to temporarily store data that has been output or will be output.

In one embodiment, the display panel 804 may be any type of display panel, such as a liquid crystal display panel based on liquid crystal display apparatus (LCD) technology, or a electromechanical laser display panel based on organic electroluminesence display (OLED) technology, and a quantum dot light emitting diode display panel or curved display panel based on quantum dot light emitting diode (QLED) technology.

In one embodiment, the circuits in the embodiments of the present application may all be implemented by a general integrated circuit, such as a central processing unit (CPU), or an application specific integrated circuit (ASIC).

Those skilled in the art can understand that all or part of the process of implementing the mischarge detection method in the above embodiment can be completed by instructing relevant hardware through a computer program, and the program can be stored in a computer readable storage medium. When the program is executed, the procedures of the above-described method embodiments can be implemented. The storage medium may be a magnetic disk, an optical disc, a read-only memory (ROM), or a random access memory (RAM), etc.

To sum up, the mischarge detection method in the present application uses the pixel electrode of the target sub-pixel to obtain the scanning signal, which is easy to operate and extremely practical. The mischarge degree of the array substrate can be obtained quickly and accurately according to the scanning signal of the target scanning line, thus having extremely high detection accuracy. Therefore, the mischarge detection method in the present application enables the technicians to accurately obtain the cyclic scan driving situation of each sub-pixel in the array substrate, which improves the picture display quality of the display panel, and has wide application value in different industrial fields.

The above are only optional embodiments of the application, and are not used to limit the application. For those skilled in the art, the present application may have various modifications and changes. Any modification, equivalent replacement, improvement, etc. made within the spirit and principle of the present application shall be included in the scope of the claims of present application.

What is claimed is:

1. A mischarge detection method, comprising:
   acquiring a target sub-pixel to be detected, and acquiring a target scanning line, a target data line and a target common electrode line, wherein the target scanning line and the target data line are connected to the target sub-pixel, and the target common electrode line is adjacent to the target sub-pixel;
   cutting off a connection between the target sub-pixel and sub-pixels adjacent to the target sub-pixel in a vertical direction;
   cutting off a connection between the target sub-pixel and the target data line;
   sequentially connecting the target scanning line, the target data line, the target common electrode line, and a pixel electrode of the target sub-pixel;
   acquiring a scanning signal of the target scanning line from the pixel electrode of the target sub-pixel;
   acquiring a mischarge degree of an array substrate according to the scanning signal of the target scanning line; and
   displaying the mischarge degree of the array substrate.

2. The mischarge detection method according to claim 1, wherein the step of cutting off the connection between the target sub-pixel and sub-pixels adjacent to the target sub-pixel in the vertical direction comprises:
   selecting a first breakpoint and a second breakpoint on the target data line, wherein the first breakpoint is located between a first intersection and a second intersection, and the second breakpoint is located between the first intersection and a third intersection;
   wherein the first intersection is a projection point of the target scanning line projected onto the target data line; the sub-pixels adjacent to the target sub-pixel in the vertical direction are a first sub-pixel and a second sub-pixel, wherein the first sub-pixel is located on a first side of the target sub-pixel, and the second sub-pixel is located on a second side of the target sub-pixel; the first sub-pixel is connected to a first scanning line and the target data line, and the second sub-pixel is connected to a second scanning line and the target data line; and the second intersection is a projection point of the first scanning line projected onto the target data line, and the third intersection is a projection point of the second scanning line projected onto the target data line; and
   cutting off the target data line at the first breakpoint, and cutting off the target data line at the second breakpoint.

3. The mischarge detection method according to claim 1, wherein the target sub-pixel comprises a first pixel electrode and a first switch tube, wherein a first conduction terminal of the first switch tube is connected to the target data line, a second conduction terminal of the first switch tube is connected to the first pixel electrode, and a control terminal of the first switch tube is connected to the target scanning line; and
   the step of cutting off the connection between the target sub-pixel and the target data line comprises:
   cutting off a connection between the first conduction terminal of the first switch tube and the target data line.

4. The mischarge detection method according to claim 1, wherein the target sub-pixel comprises a first pixel electrode and a first switch tube, wherein a first conduction terminal of the first switch tube is connected to the target data line, a second conduction terminal of the first switch tube is connected to the first pixel electrode, and a control terminal of the first switch tube is connected to the target scanning line; and
   the step of cutting off the connection between the target sub-pixel and the target data line comprises:
   cutting off a connection between the second conduction terminal of the first switch tube and the first pixel electrode.

5. The mischarge detection method according to claim 1, wherein the step of sequentially connecting the target scanning line, the target data line, the target common electrode line, and the pixel electrode of the target sub-pixel comprises:
   welding an overlap between the target scanning line and the target data line;
   welding an overlap between the target data line and the target common electrode line; and
   welding an overlap between the target common electrode line and the pixel electrode of the target sub-pixel.

6. The mischarge detection method according to claim 5, wherein
   printing a solder at the overlap between the target scanning line and the target data line to cover the overlap between the target scanning line and the target data line with a first solder paste and to connect the target scanning line and the target data line via the first solder paste;

printing the solder at the overlap between the target data line and the target common electrode line to cover the overlap between the target data line and the target common electrode line with a second solder paste and to connect the target data line and the target common electrode line via the second solder paste; and printing the solder at the overlap between the target common electrode line and the pixel electrode of the target sub-pixel to cover the overlap between the target common electrode line and the pixel electrode of the target sub-pixel with a third solder paste and to connect the target common electrode line and the pixel electrode of the target sub-pixel via the third solder paste.

7. The mischarge detection method according to claim 1, wherein the step of acquiring the scanning signal of the target scanning line from the pixel electrode of the target sub-pixel comprises:

contacting a microscope probe with the pixel electrode of the target sub-pixel to acquire the scanning signal of the target scanning line.

8. The mischarge detection method according to claim 1, wherein the step of acquiring the mischarge degree of the array substrate according to the scanning signal of the target scanning line comprises:

outputting the scanning signal of the target scanning line to an oscilloscope to obtain a delay status of the scanning signal of the target scanning line; and acquiring the mischarge degree of the array substrate according to the delay status of the scanning signal of the target scanning line.

9. The mischarge detection method according to claim 8, wherein the step of displaying the mischarge degree of the array substrate comprises:

displaying the mischarge degree of the array substrate on the oscilloscope.

10. The mischarge detection method according to claim 8, wherein the step of displaying the mischarge degree of the array substrate comprises:

displaying the mischarge degree of the array substrate in an external display panel.

11. The mischarge detection method according to claim 1, wherein the step of acquiring the target sub-pixel to be detected, and acquiring the target scanning line, the target data line and the target common electrode line comprises:

acquiring the target sub-pixel to be detected according to an operation command from a user, and acquiring the target scanning line, the target data line and the target common electrode line.

12. The mischarge detection method according to claim 1, wherein after acquiring the mischarge degree of the array substrate according to the scanning signal of the target scanning line, the mischarge detection method further comprises:

sending out a fault alarm signal when the mischarge degree of the array substrate is greater than a safe operation range of the array substrate.

13. The mischarge detection method according to claim 12, wherein after acquiring the mischarge degree of the array substrate according to the scanning signal of the target scanning line, the mischarge detection method further comprises:

sending out a safe operation signal when the mischarge degree of the array substrate is small than or equal to the safe operation range of the array substrate.

14. The mischarge detection method according to claim 1, wherein after acquiring the target sub-pixel to be detected, the mischarge detection method further comprises:

detecting structure parameters of the target sub-pixel.

15. The mischarge detection method according to claim 14, wherein the structure parameters of the target sub-pixel comprise:

a shape and an area of the target sub-pixel.

16. The mischarge detection method according to claim 1, wherein the target sub-pixel is one selected from the group consisting of a read sub-pixel, a green sub-pixel and a blue sub-pixel.

17. A mischarge detection apparatus, comprising:

a target sub-pixel acquisition circuit, wherein the target sub-pixel acquisition circuit is configured for acquiring a target sub-pixel that is to be detected, and acquiring a target scanning line, a target data line and a target common electrode line, wherein the target scanning line and the target data line are connected to the target sub-pixel, and the target common electrode line is adjacent to the target sub-pixel;

a first cutoff circuit, wherein the first cutoff circuit is configured for cutting off a connection between the target sub-pixel and sub-pixels adjacent to the target sub-pixel in a vertical direction;

a second cutoff circuit, wherein the second cutoff circuit is configured for cutting off a connection between the target sub-pixel and the target data line;

a welding circuit, wherein the welding circuit is configured for sequentially connecting the target scanning line, the target data line, the target common electrode line, and a pixel electrode of the target sub-pixel;

a signal acquisition circuit, wherein the signal acquisition circuit is configured for acquiring a scanning signal of the target scanning line from the pixel electrode of the target sub-pixel;

a status acquisition circuit, wherein the status acquisition circuit is configured for acquiring a mischarge degree of an array substrate according to the scanning signal of the target scanning line; and a status display circuit, wherein the status display circuit is configured for displaying the mischarge degree of the array substrate.

18. The mischarge detection apparatus according to claim 17, wherein the signal acquisition circuit comprises:

a microscope probe, wherein the microscope probe is configured for contacting the pixel electrode of the target sub-pixel to acquire the scanning signal of the target scanning line.

19. The mischarge detection apparatus according to claim 17, wherein the status display circuit comprises:

an oscilloscope, wherein the oscilloscope is configured for receiving the scanning signal of the target scanning line, and displaying the mischarge degree of the array substrate according to the scanning signal of the target scanning line.

20. A display apparatus, comprising a memory, a processor, a computer program and a display panel; wherein the computer program is stored in the memory and the computer program is configured for running on the processor;

the display panel comprises a plurality of sub-pixels arranged in an array, and each sub-pixel of the plurality of sub-pixels is defined by intersections of scanning lines and data lines; and the processor is configured for implementing a mischarge detection method when executing the computer program;

wherein the mischarge detection method comprises:

acquiring a target sub-pixel that is to be detected, and acquiring a target scanning line, a target data line and a target common electrode line adjacent to the target sub-pixel, wherein the target scanning line and the target data line are connected to the target sub-pixel, and the target common electrode line is adjacent to the target sub-pixel;

cutting off a connection between the target sub-pixel and sub-pixels adjacent to the target sub-pixel in a vertical direction;

cutting off a connection between the target sub-pixel and the target data line;

sequentially connecting the target scanning line, the target data line, the target common electrode line, and a pixel electrode of the target sub-pixel;

acquiring a scanning signal of the target scanning line from the pixel electrode of the target sub-pixel;

acquiring a mischarge degree of an array substrate according to the scanning signal of the target scanning line; and displaying the mischarge degree of the array substrate.

* * * * *